United States Patent
Hsiao et al.

(10) Patent No.: US 8,780,499 B2
(45) Date of Patent: Jul. 15, 2014

(54) MAGNETIC WRITE HEAD HAVING A RESIDUAL SHIELD SEED LAYER FOR REDUCING OVERWRITING

(71) Applicant: HGST Netherlands B.V., Amsterdam (NL)

(72) Inventors: Wen-Chien D. Hsiao, San Jose, CA (US); Quan-chiu H. Lam, San Jose, CA (US); Terence T. L. Lam, Cupertino, CA (US); Aron Pentek, San Jose, CA (US); Yi Zheng, San Ramon, CA (US); Yuming Zhou, Lakeville, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/720,971

(22) Filed: Dec. 19, 2012

(65) Prior Publication Data
US 2014/0168823 A1    Jun. 19, 2014

(51) Int. Cl.
*G11B 5/11*    (2006.01)
*G11B 5/23*    (2006.01)

(52) U.S. Cl.
USPC .............. 360/125.3; 360/119.04; 360/125.71

(58) Field of Classification Search
USPC .............. 360/125.3, 125.71, 119.01, 119.02, 360/119.03, 119.04
See application file for complete search history.

(56) References Cited

U.S. PATENT DOCUMENTS

| | | |
|---|---|---|
| 5,805,392 A | 9/1998 | Mallary et al. |
| 8,000,059 B2 | 8/2011 | Jiang et al. |
| 8,021,535 B2 | 9/2011 | Bonhote et al. |
| 8,409,453 B1 * | 4/2013 | Jiang et al. ............... 216/22 |
| 8,582,241 B1 * | 11/2013 | Yu et al. .............. 360/125.43 |
| 2010/0157484 A1 | 6/2010 | Etoh et al. |
| 2011/0132869 A1 | 6/2011 | Hong et al. |
| 2011/0146062 A1 * | 6/2011 | Allen et al. ............. 29/603.18 |
| 2012/0002326 A1 * | 1/2012 | Mino et al. ............ 360/123.12 |
| 2012/0125885 A1 * | 5/2012 | Chen et al. ................ 216/22 |
| 2012/0127612 A1 * | 5/2012 | Shin et al. ............. 360/123.12 |

OTHER PUBLICATIONS

Bai et al., "Stitched pole-tip design with enhanced head field for perpendicular recording," May 15, 2003, Journal of Applied Physics, vol. 93, No. 10, pp. 6540-6542.

* cited by examiner

Primary Examiner — Jefferson Evans
(74) Attorney, Agent, or Firm — Zilka-Kotab, PC

(57) ABSTRACT

A magnetic write head having a write pole and a trailing, wrap-around magnetic shield formed over the write pole and separated from the write pole by a non-magnetic trailing gap layer and non-magnetic side gap layers. The write head includes a remnant magnetic seed layer, that while being used to facilitate electroplating of the magnetic shield, is left intentionally extending beyond the back edge of the magnetic shield. This extended portion of the magnetic seed layer acts as a shunt for magnetic flux and prevents data erasure due to over-writing.

22 Claims, 19 Drawing Sheets

MAGNETIC WRITE HEAD HAVING A RESIDUAL SHIELD SEED LAYER FOR REDUCING OVERWRITING

FIELD OF THE INVENTION

The present invention relates to magnetic data recording and more particularly to a magnetic write element having a residual trailing wrap around shield seed layer for reducing overwriting and associated data erasure.

BACKGROUND OF THE INVENTION

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

During magnetic recording, residual magnetization of the write pole can cause unintended data erasure. This residual magnetization of the write pole causes the write pole to generate a magnetic write field after writing should have ceased. This effect becomes even more pronounced if the write head includes one or more stitched magnetic poles that are magnetically connected with the write pole and which help to channel magnetic flux to the write pole. Therefore, there is a need for a magnetic write head design that can prevent this data erasure as well as adjacent and far track interference that might otherwise result from such residual magnetization.

SUMMARY OF THE INVENTION

The present invention provides a magnetic write head that includes a magnetic write pole extending to an air bearing surface and having first and second laterally opposed sides and a trailing edge extending from the first side to the second side. A non-magnetic trailing gap layer is formed on the trailing edge of the write pole and first and second non-magnetic side gap layers are formed at the first and second sides of the write pole. A magnetic seed layer is formed over the non-magnetic trailing gap layer and over the first and second non-magnetic side gap layers. A magnetic shield is formed over the seed layer. The magnetic shield has a back edge opposite the air bearing surface, and the magnetic seed layer extends beyond the back edge of magnetic shield.

The magnetic seed layer, extending beyond the back edge of the magnetic shield, provides a magnetic shunt that prevents unintended data erasure that would otherwise occur as a result of overwriting. What's more, the magnetic seed layer is a by-product of the electroplating process used to manufacture the magnetic shield. It can therefore, be formed with very little added cost or complexity.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
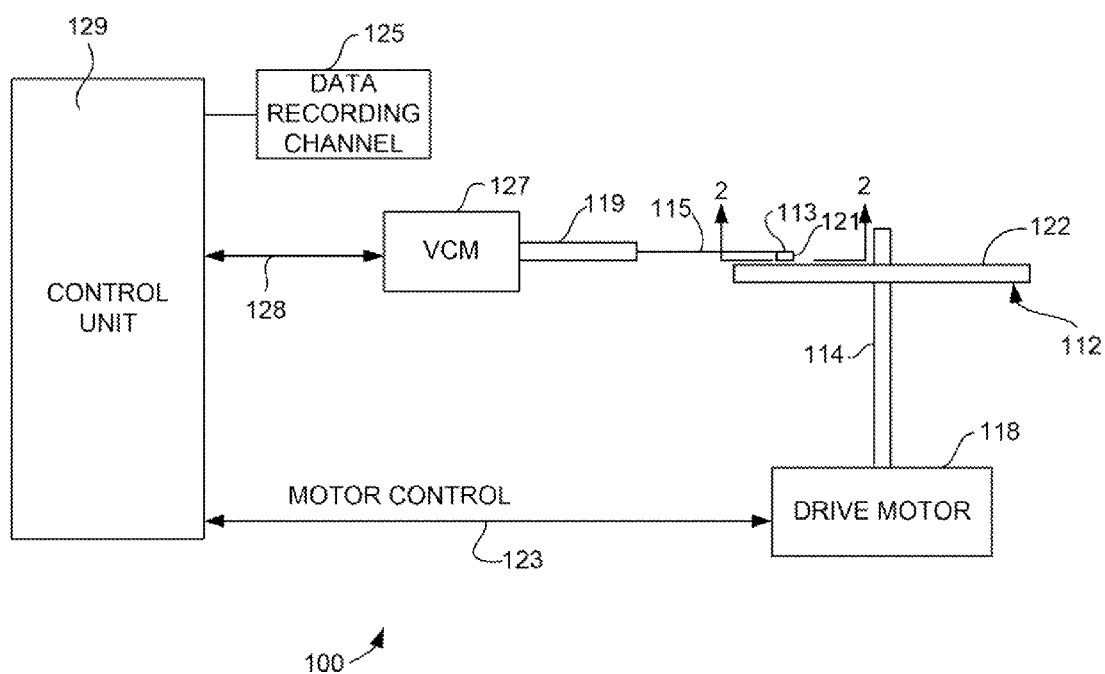
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 12 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
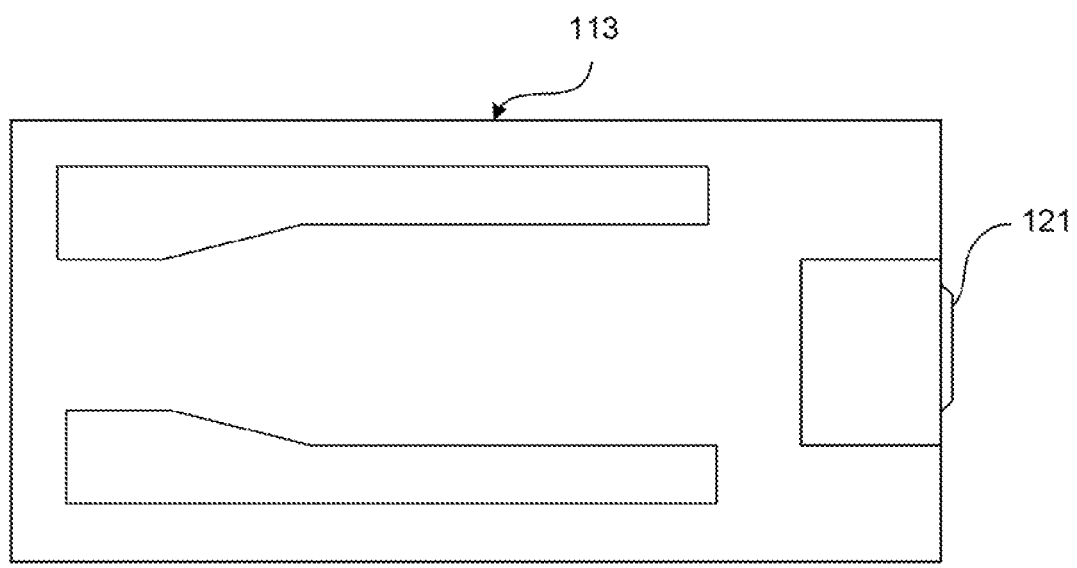
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
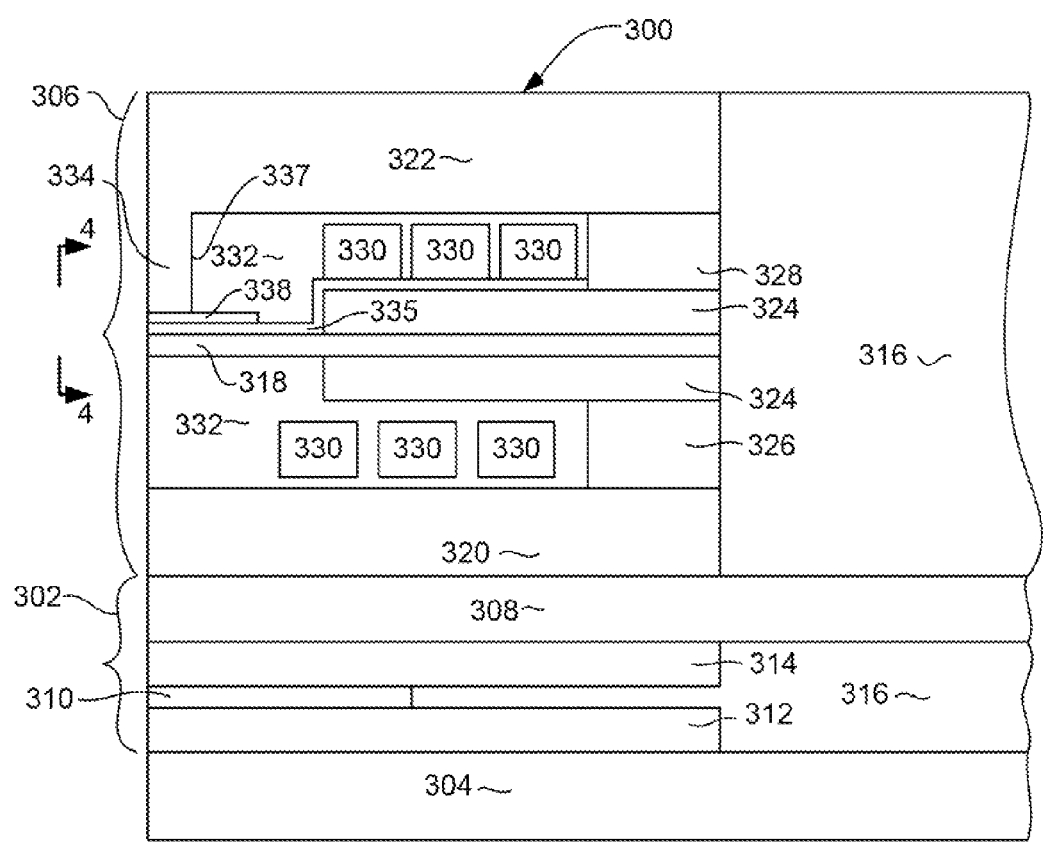
FIG. 3 is a side cross sectional view of a magnetic head according to an embodiment of the invention.

FIG. 3 shows a side, cross sectional view of magnetic head 300 according to a possible embodiment of the invention. The magnetic head 300 includes a read head 302 formed on a slider body substrate 304, and a write head 306 formed over the read head 302. The read head 302 and write head 306 may be separated by a non-magnetic spacer layer 308 such as alumina. The read head 302 can include a magnetoresistive sensor element 310 sandwiched between first and second magnetic shields 312, 314, all of which can be encased in a non-magnetic electrically insulating fill layer 316 such as alumina.

The write head 306 includes a magnetic write pole 318, a leading magnetic return pole 320, and may include a trailing return pole 322. The write pole 318 can be magnetically connected with magnetic stitched poles (also referred to as shaping layers) 324 that help to conduct magnetic flux to the write pole 318. The write pole 318 and shaping layers 324 can be magnetically connected with the return poles 320, 322 by magnetic back gap structures 326, 328. The write head 306 also includes a non-magnetic, electrically conductive write coil 330, which can be constructed of a material such as Cu and which is shown in cross section in FIG. 3. The write coil 330 can be embedded in one or more non-magnetic insulation layers 332 which can be a material such as alumina and/or hard baked photoresist.

When an electrical current flows through the write coil 330, a resulting magnetic field causes a magnetic flux to flow through the magnetic layers 320, 326, 324, 328, 318, 322. This causes a write field to be emitted from the tip of the write pole 318 at the ABS, which can write a bit of data to an adjacent magnetic medium (not shown in FIG. 3). A magnetic trailing shield 334 can be provided adjacent to the trailing edge of the write pole 318 and can be connected with the trailing return pole 322 as shown in FIG. 3. The magnetic trailing shield 334 is separated from the trailing edge of the write pole 318 by a non-magnetic trailing gap layer 335. This trailing magnetic shield 334 increases the field gradient of the write field being emitted from the write pole 318. This results in improved magnetic switching during writing of data.

Figure 19:
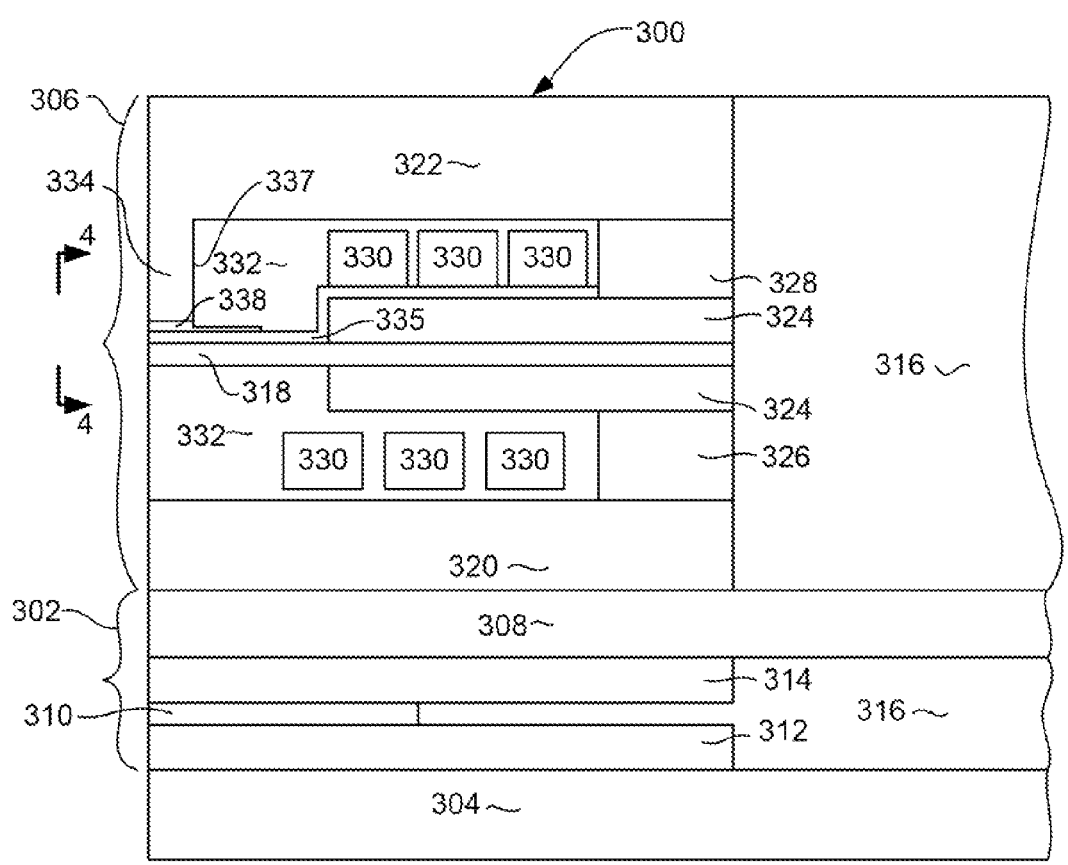
FIG. 19 is a side cross sectional view of a magnetic head, similar to that of FIG. 3 according to an embodiment of the invention.

With continued reference to FIG. 3, a remnant magnetic seed layer 338 is located between the trailing shield 334 and the trailing gap layer 335, and extends beyond the back edge 337 of the trailing shield 334. Therefore, the remnant magnetic seed layer is separated from the write pole 318 by the trailing gap layer, as shown in FIG. 3. The remnant seed layer can be constructed of a layer of CoFe and a layer of NiFe (CoFe/NiFe), and preferably has a thickness of 5-20 nm. In FIG. 3 the remnant seed layer 338 is shown having a thickness beyond the back edge 337 of the trailing shield 334 that is equal to its thickness at the air bearing surface ABS and between the trailing shield 334 and write pole 318. This is one possible configuration. However, in another configuration as shown in FIG. 19, the remnant seed layer could be thinner in this region that extends beyond back edge 337 of the trailing shield 334 than it is at the ABS and than it is in the region between the trailing shield 337 and write pole 318. In other words, the remnant seed layer 338 can have a constant thickness (as shown in FIG. 3) or can have a reduced thickness beyond the back edge 337 of the trailing magnetic shield 334 (as shown in FIG. 19).

Figure 4:
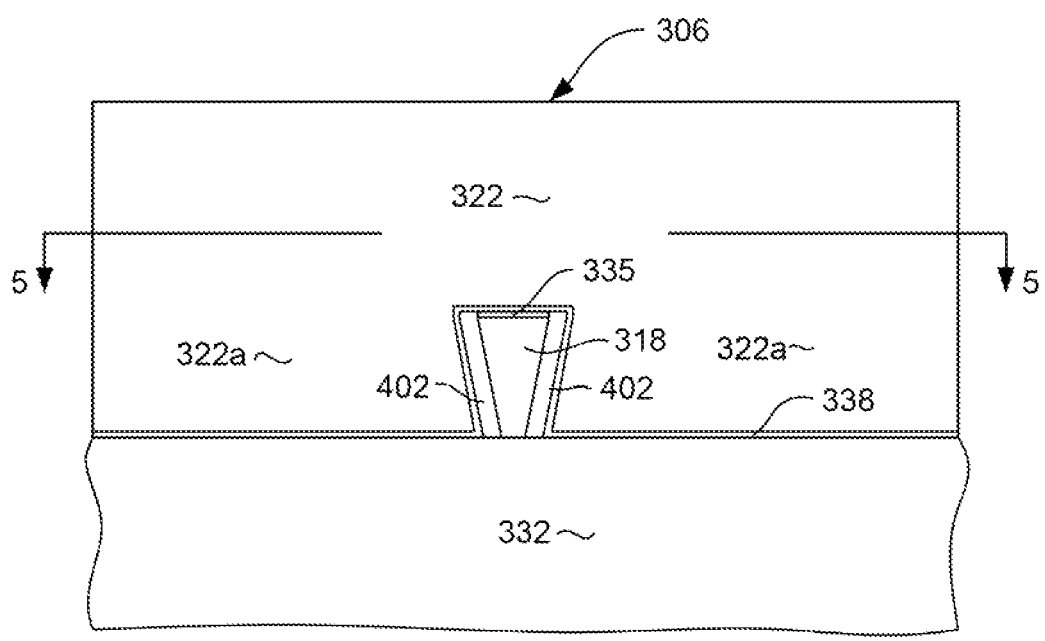
FIG. 4 is an enlarged, ABS view of a portion of the magnetic head of FIG. 3 as seen from line 4-4 of FIG. 3.

FIG. 4 shows an enlarged ABS view of a portion of the magnetic write head 306 as seen from line 4-4 of FIG. 3. In FIG. 4 it can be seen that the tip of the write pole 318 can have beveled sides so that it forms a trapezoidal shape as viewed from the air bearing surface (ABS). At very small track-widths, the write pole 318 could resemble a triangular shape rather than a trapezoidal shape. As seen in FIG. 4, the trailing shield wraps around the write pole 318 to form first and second side shield portions 322a that are separated from the sides of the write pole 318 by first and second non-magnetic side gap layers 402. Because the shield 322 wraps around the write pole 318 in this manner, it can be referred to as a trailing, wrap-around magnetic shield. It can also be seen that the remnant magnetic seed layer 338 is formed at the bottom of the magnetic shield 322, separating the shield 322 from the substrate 332, side gap layers 402 and trailing gap layer 335. This magnetic shield is a remnant of an electroplating process used to construct the shield 332, which will be described in greater detail herein below.

Figure 5:
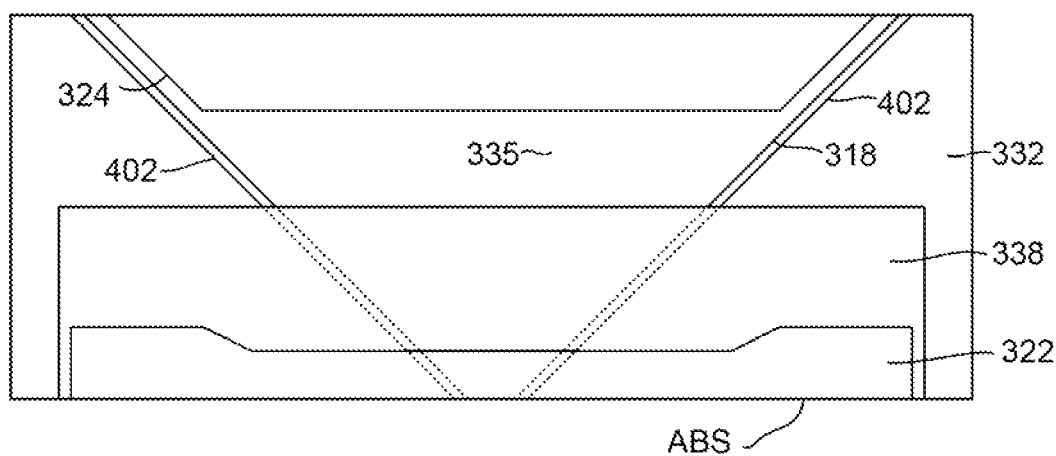
FIG. 5 is a top down view of the write head of FIGS. 3 and 4 as seen from line 5-5 of FIG. 3.

FIG. 5 shows a top down view as seen from line 5-5 of FIG. 4, showing the write pole 318, side gap layers 402, remnant seed layer 338, trailing, wrap-around magnetic shield portions 322 and the upper stitched pole 324. With reference to both FIGS. 4 and 5, it can be seen that the remnant magnetic seed layer 338 extends beyond the back edge of the shield 322 and over the write pole 318 (and trailing gap layer 335). The portions of the magnetic write pole 318 and side gap layers 402 that extend beneath the remnant seed layer 332 are shown in dashed line in FIG. 5 to indicate that they are hidden beneath the seed layer 338. It should also be understood that the trailing gap layer 318 is between the remnant seed layer 338 and write pole 318 as shown in FIG. 4, and is also hidden beneath the remnant seed layer in FIG. 5.

The presence of the magnetic remnant seed layer 338 helps to avoid unwanted data erasure due to overwriting and also to avoid adjacent track and far track erasure. With reference again to FIG. 3, during data writing, a magnetic flux flows through the stitched poles 324 to the write pole 318. This magnetic flux causes a write field to be emitted from the tip of the write pole 318 to write to an adjacent magnetic medium (not shown in FIG. 3). When a magnetic bit is finished being recorded, the magnetic write field should cease. However, residual magnetic flux remaining in the stitched poles 324 can drive continued flux through the write pole 318, causing an unwanted over-write condition, where write field continues after writing should have stopped. The presence of the magnetic remnant seed layer 338 prevents this over-writing by providing a pathway for magnetic flux to be shunted away from the tip of the write pole rather than generating an unwanted over-write field.

Figure 6:
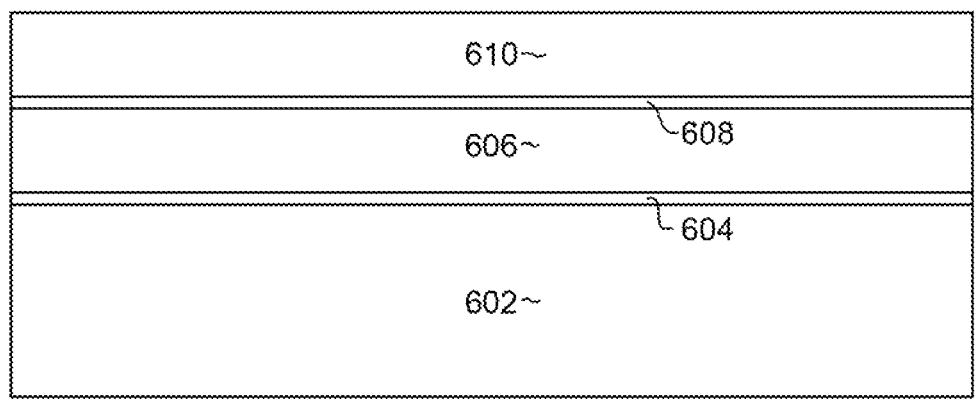
FIGS. 6-18 are views of a portion of a magnetic write head in various intermediate stages of manufacture, illustrating a method of manufacturing a magnetic write head according to an embodiment of the invention.

FIGS. 6-18 show a portion of a write head in various intermediate stages of manufacture in order to illustrate a method of manufacturing a magnetic write head according to an embodiment of the invention. With particular reference to FIG. 6, a substrate 602 is formed and planarized by a process such as chemical mechanical polishing. The substrate 602 can include the fill layer 332 and bottom stitched pole 324 shown in FIG. 3. A layer of material that is resistant to chemical mechanical polishing (RIE stop layer) 604 is deposited over the substrate 602. The RIE stop layer can be a material such as Ru or some other suitable material. A RIEable fill layer 606 is then deposited over the RIE stop layer 604. The term "RIEable" as used herein refers to a material that can be readily removed by reactive ion etching (RIE). The RIEable fill layer 606 can be alumina $Al_2O_3$. A RIE hard mask layer 608 can be deposited over the RIEble fill layer 606. The RIEable hard mask layer can be a material such as CoFe/NiFe. Then, a mask material 610 is deposited over the hard mask 608. The mask material 610 includes a photoresist material, but could include other materials as well, such as but not limited to an bottom anti-reflective coating, an additional hard mask, an image transfer layer, an adhesion layer, etc.

Figure 7:
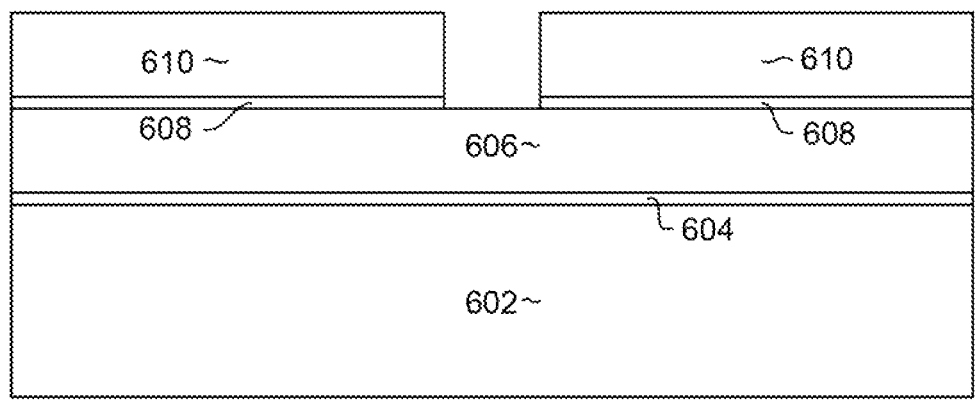

With reference now to FIG. 7 the mask layer 610 is photolithographically patterned to form a mask 610 with an opening that is configured to define a write pole shape. A material removal process such as ion milling or reactive ion etching in a chemistry chosen to remove the material of the hard mask layer 608 can be used to transfer the pattern of the mask 610 onto the under-lying hard mask 608 by removing portions of the hard mask 608 that are not protected by the mask 610.

Figure 8:
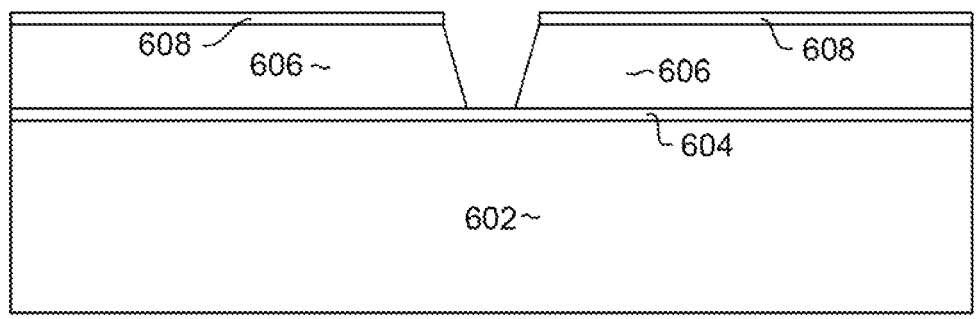

Then, a second reactive ion etching process can be performed, using a chemistry that is chosen to remove the RIEable fill material 606 at a faster rate than the hard mask layer 608. This reactive ion etching is performed so as to form a trench in the fill layer 606 as shown in FIG. 8. This second reactive ion etching can be performed until the RIE stop layer 604 has been reached. As shown in FIG. 8 this reactive ion etching may also remove most or all of the mask layer 610 (FIG. 7).

Figure 9:
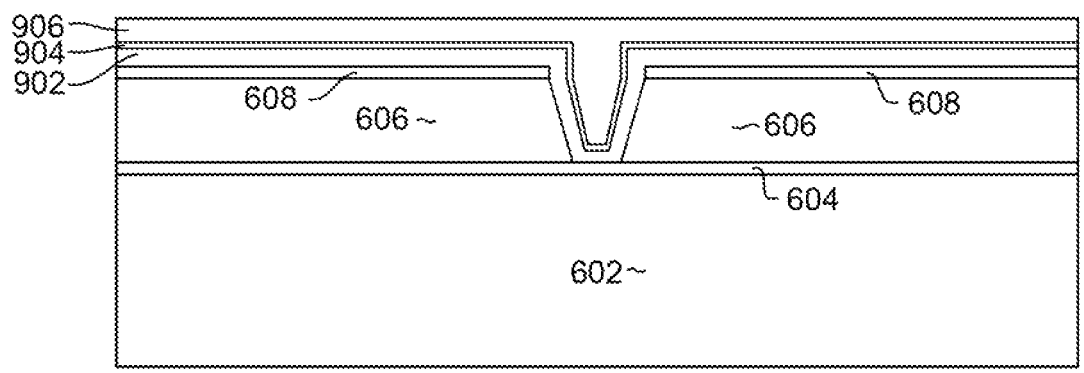
Figure 10:
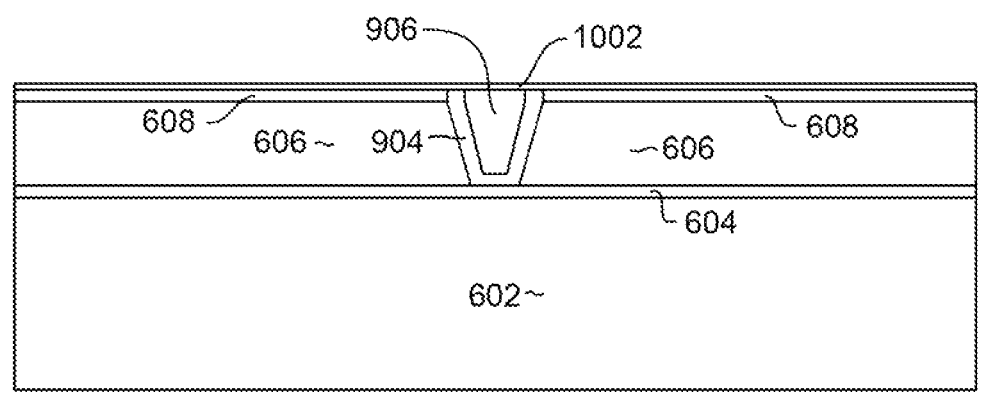

With reference to FIG. 9, after the trench has been formed, a non-magnetic side wall material 902 can be deposited by a conformal process such as atomic layer deposition or chemical vapor deposition. An electrically conductive, electroplating seed layer 904 is deposited, and then a magnetic material such as CoFe 906 is electroplated into the trench. A chemical mechanical polishing process can be performed, and then a non-magnetic trailing gap layer 1002 can be deposited, leaving a structure as shown in FIG. 10.

Figure 11:
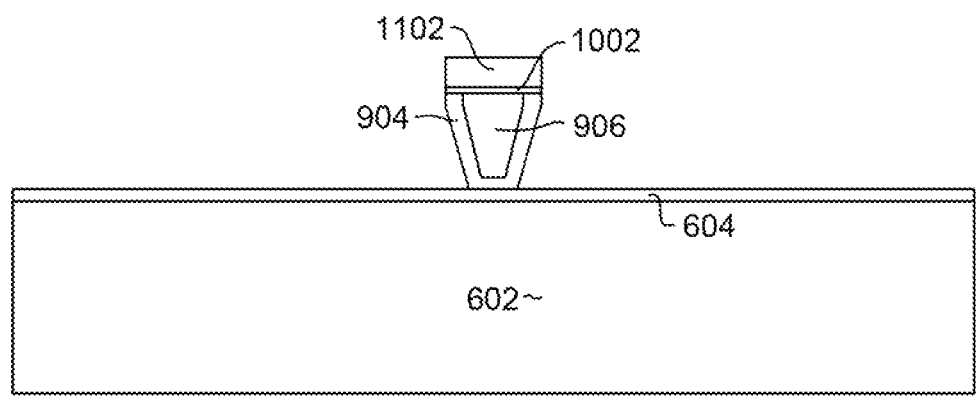
Figure 12:
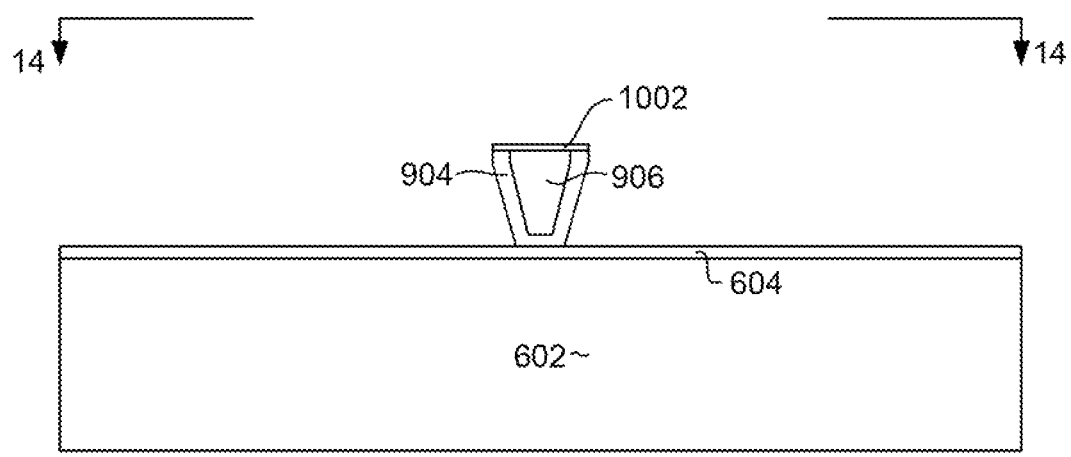

With reference to FIG. 11, a mask can be formed over the trailing gap layer 1002 in the region over the magnetic write pole material and one or more of ion milling and/or reactive ion etching (RIE) can be used to remove the RIEable fill layer at the sides of the magnetic write pole material 906 and side gap layer 904. The mask 1002 can then be removed leaving a structure as shown in FIG. 12.

The above described processes, therefore, form a write pole 906 with a non-magnetic trailing shield 1002 and non-magnetic side gap layer 904. It should be pointed out, however, that this is by way of example only. Other processes could be used to define a write pole with a trailing gap layer and side gap layers. For example a process (not shown) could include depositing a magnetic material full film, then forming a mask over the magnetic material that is configured to define a write pole. An ion milling could then be performed to remove portions of the magnetic material that are not protected by the mask.

Figure 13:
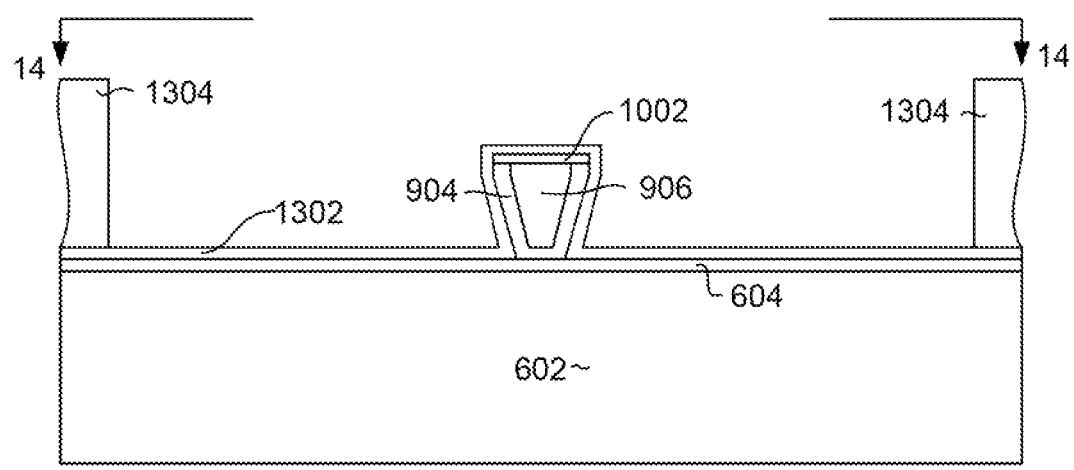
Figure 14:
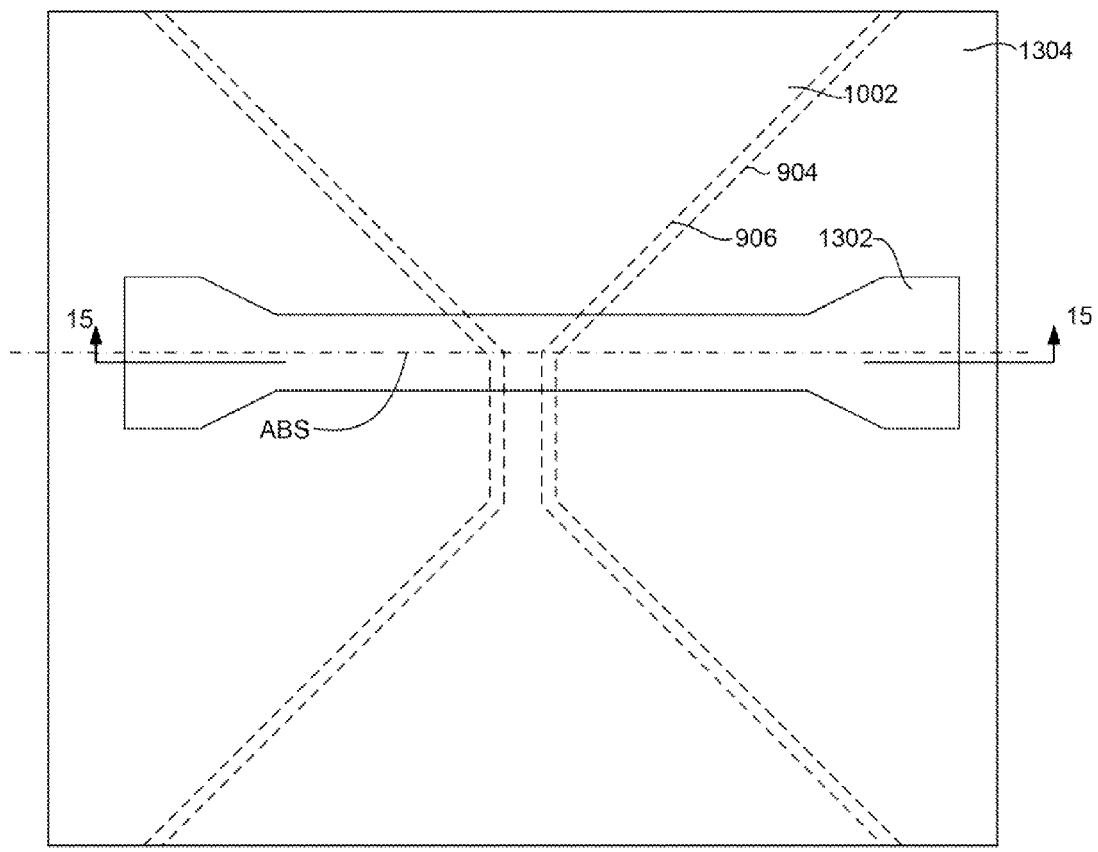

With reference now to FIG. 13, a magnetic, electrically conductive seed layer 1302 is deposited. This material will make up the extended remnant seed layer 338 described above with reference to FIGS. 3-5. To this end, the seed layer 1302 can be a material such as CoFe and NiFe. An electroplating frame mask 1304 is then formed over seed layer 1302. The electroplating frame mask is formed with an opening that is configured to define a trailing, wrap-around magnetic shield such as the shield 322 described above with reference to FIGS. 3-5. This opening in the mask 1304 can be seen more clearly with reference to FIG. 14, which shows a top down view as seen from line 14-14 of FIG. 13. In FIG. 14 the magnetic write pole material 906, side shield material 904 and trailing shield material 1002 are hidden beneath the seed layer 1302 and are, therefore, shown in dashed line. In FIG. 14, the dotted/dashed line denoted "ABS" indicates the location of an intended air bearing surface plane, where the air bearing surface will eventually be located after slicing and lapping operations.

Figure 15:
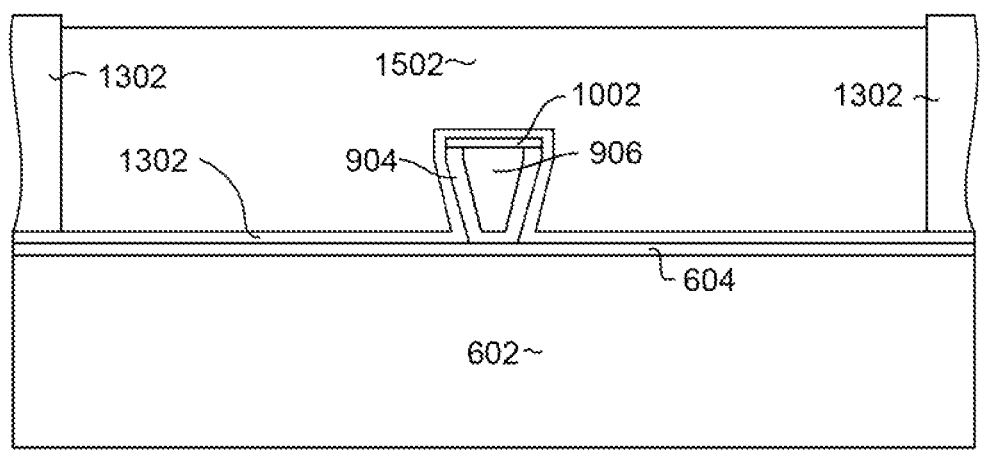
Figure 16:
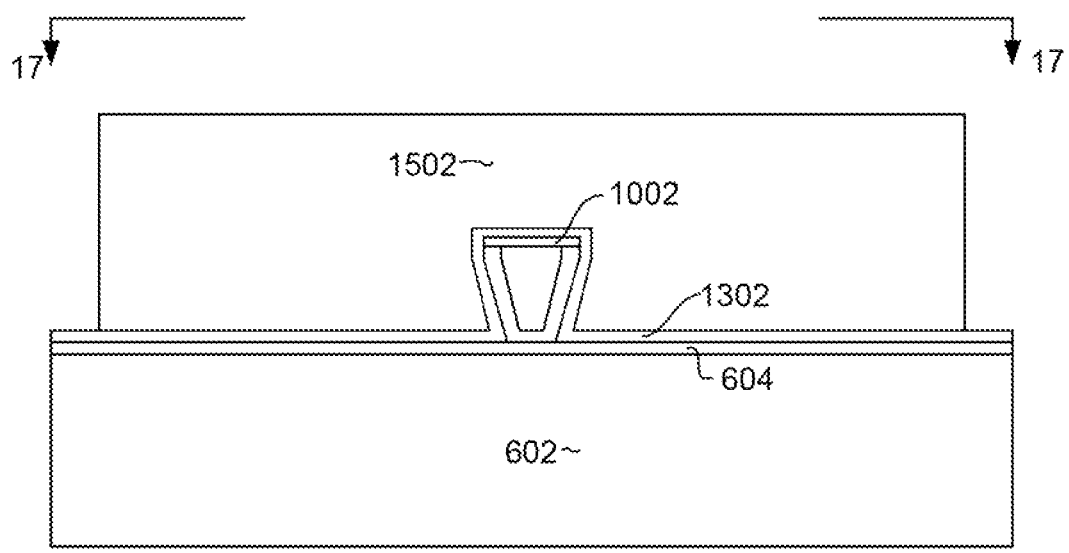

With reference to FIG. 15, an electroplating process can then be performed to electroplate a magnetic material such as NiFe into the opening in the mask 1304. FIG. 15 shows a cross sectional view of a plane that is parallel with the air bearing surface, such as taken from line 15-15 of FIG. 14. The mask 1302 can then be removed, leaving a structure with a shield 1502 as shown in FIG. 16.

Figure 17:
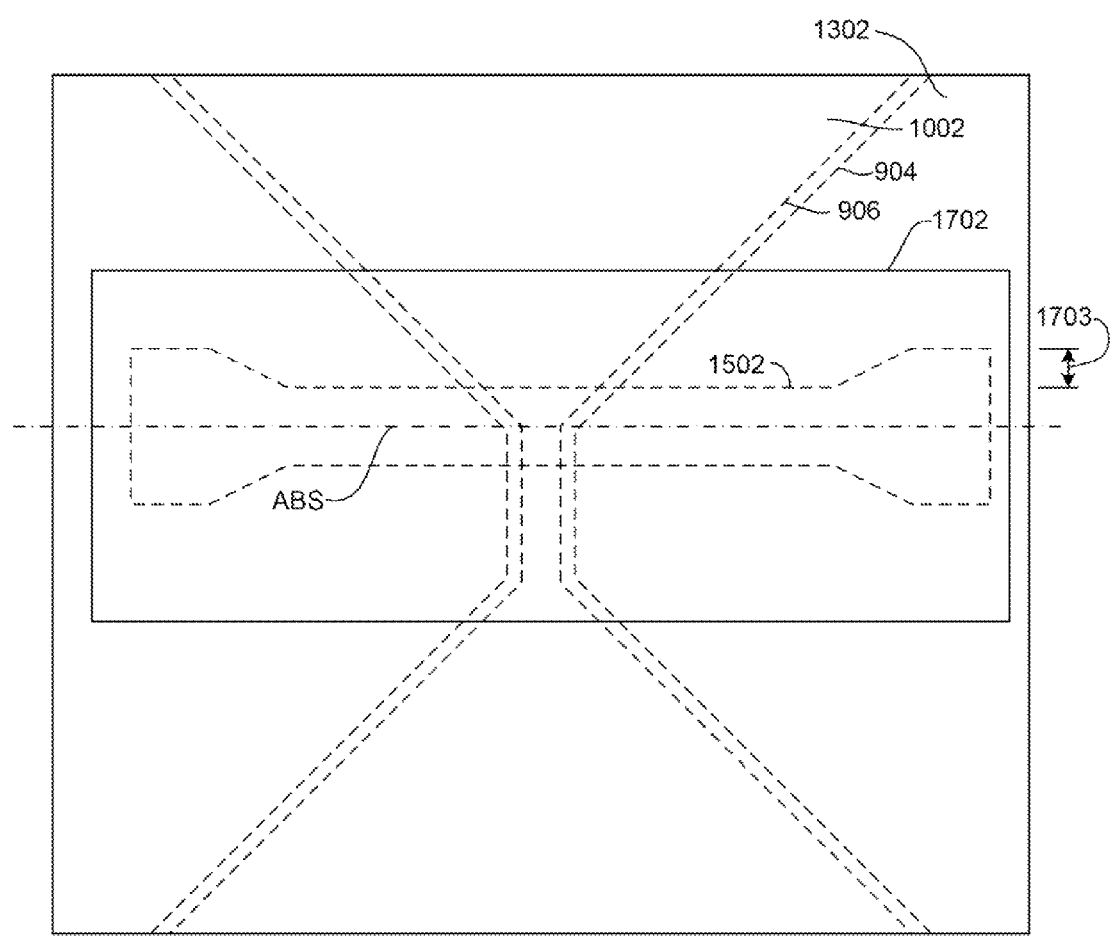
Figure 18:
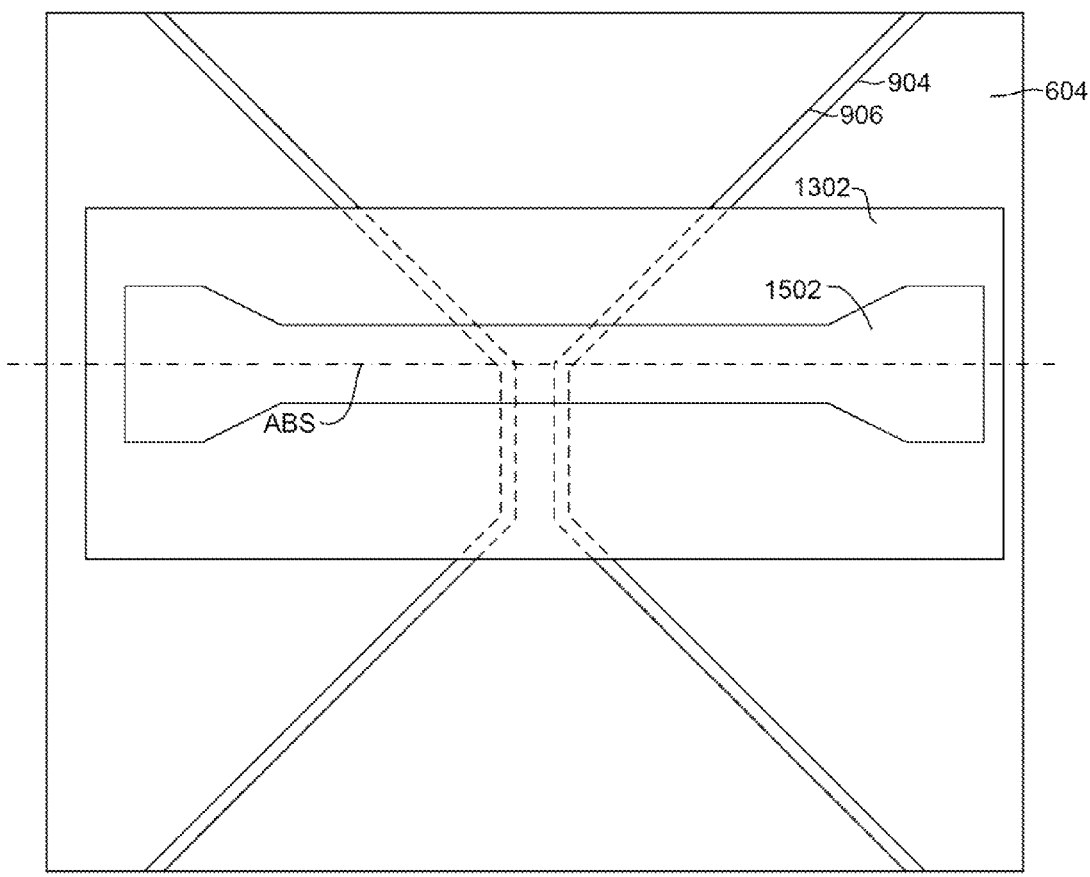

With reference to FIG. 17, another mask 1702 can be formed. This mask 1702 is configured to define how far the seed layer 1302 will extend beyond the shield 1502. FIG. 17 shows a top down view as seen from line 17-17 of FIG. 16. In FIG. 17, it can be seen that the mask 1702 extends beyond the back edge of the shield 1502 by a distance 1703 that is chosen to provide a desired amount of magnetic flux shunting. This distance 1703 is preferably at least 50 nm, and is more preferably 500 nm. After the mask 1702 has been formed, a quick reactive ion etching or ion milling can be performed to remove portions of the seed layer 1302 that are not protected by the mask 1702. Thereafter, the mask 1702 can be removed, leaving a structure as shown in FIG. 18.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
a magnetic write pole extending to an air bearing surface and having first and second laterally opposed sides and a trailing edge extending from the first side to the second side;
a non-magnetic trailing gap layer formed on the trailing edge of the write pole;
first and second non-magnetic side gap layers formed at the first and second sides of the write pole;
a magnetic seed layer formed over the non-magnetic trailing gap layer and over the first and second non-magnetic side gap layers; and
a magnetic shield formed over the seed layer and having a back edge opposite the air bearing surface;

wherein the magnetic seed layer extends beyond the back edge of magnetic shield.

2. The magnetic write head as in claim 1, wherein the magnetic seed layer comprises CoFe and NiFe.

3. The magnetic write head as in claim 1, wherein the magnetic seed layer that extends beyond the back edge of the shield has a thickness of 5-20 nm.

4. The magnetic write head as in claim 1, wherein the magnetic seed layer extends beyond the back edge of the shield by a distance of at least 50 nm.

5. The magnetic write head as in claim 1, wherein the magnetic seed layer extends beyond the back edge of the shield by a distance of 500 nm.

6. The magnetic write head as in claim 1, wherein the magnetic shield is a trailing, wrap-around magnetic shield.

7. The magnetic write head as in claim 1, further comprising a stitched magnetic pole that is magnetically connected with the write pole and that is recessed from the air bearing surface.

8. The magnetic write head as in claim 1, further comprising first and second stitched magnetic poles that are recessed from the ABS, the magnetic write pole being sandwiched between the first and second stitched magnetic poles.

9. The magnetic write head as in claim 1, wherein the write pole is formed on a substrate and wherein the magnetic seed layer extends over a portion of the substrate and extends beyond the back edge of the magnetic shield as it extends over the substrate.

10. The magnetic write head as in claim 1, wherein the magnetic seed layer has a reduced thickness beyond the back edge of the trailing shield.

11. The magnetic write head as in claim 1, wherein the magnetic seed layer has a constant thickness.

12. A method for manufacturing a magnetic write head, comprising:
   forming a magnetic write pole over a substrate, the magnetic write pole having first and second laterally opposed sides and a trailing edge extending from the first side to the second side, and having a non-magnetic side gap layer formed at each of the first and second sides and a non-magnetic trailing gap layer formed on the trailing edge;
   depositing a magnetic seed layer over the non-magnetic trailing gap layer, over the non-magnetic side gap layers, and over the substrate;
   electroplating a magnetic shield over the magnetic seed layer, the magnetic shield having a back edge;
   forming a mask structure over the magnetic shield and a portion of the magnetic seed layer, the mask structure having a back edge located a predetermined distance beyond the back edge of the magnetic shield; and
   performing a material removal process to remove portions of the magnetic seed layer that are not protected by the mask structure so as to form the magnetic seed layer with a back edge located at the predetermined distance beyond the back edge of the magnetic shield.

13. The method as in claim 12, wherein the magnetic write pole is formed by a damascene method.

14. The method as in claim 12, wherein the magnetic write pole is formed by a process that includes depositing a magnetic material, forming a write pole defining mask structure over the magnetic material and performing an ion milling to remove portions of the magnetic material that are not protected by the mask structure.

15. The method as in claim 12, wherein the mask structure has a back edge that is located at least 50 nm beyond the back edge of the magnetic shield.

16. The method as in claim 12, wherein the mask structure has a back edge that is located 50 nm to 500 nm beyond the back edge of the magnetic shield.

17. The method as in claim 12, wherein the magnetic seed layer comprises CoFe and NiFe.

18. The method as in claim 12, wherein the magnetic seed that extends beyond the back edge of the shield has a thickness of 5-20 nm.

19. The method as in claim 12, wherein the magnetic seed layer that extends beyond the back edge of the shield comprises CoFe NiFe and has a thickness of 5-20 nm.

20. The method as in claim 12, wherein the material removal process comprises reactive ion etching.

21. The method as in claim 12, wherein the material removal process comprises ion milling.

22. A magnetic data recording system, comprising:
   a housing;
   a magnetic media mounted within the housing;
   an actuator;
   a slider connected with the actuator for movement adjacent to a surface of the magnetic media; and
   a magnetic write head formed on the slider, the magnetic write head further comprising:
   a magnetic write pole extending to an air bearing surface and having first and second laterally opposed sides and a trailing edge extending from the first side to the second side;
   a non-magnetic trailing gap layer formed on the trailing edge of the write pole;
   first and second non-magnetic side gap layers formed at the first and second sides of the write pole;
   a magnetic seed layer formed over the non-magnetic trailing gap layer and over the first and second sides; and
   a magnetic shield formed over the seed layer and having a back edge opposite the air bearing surface;
   wherein the magnetic seed layer extends beyond the back edge of magnetic shield.

* * * * *